(12) United States Patent
Sorenson et al.

(10) Patent No.: US 6,584,311 B1
(45) Date of Patent: Jun. 24, 2003

(54) TECHNIQUES FOR FACILITATING OPTIMAL SERVICE ACQUISITION

(75) Inventors: John R. Sorenson, San Diego, CA (US); Baaziz Achour, San Diego, CA (US); Jan C. Ault, Santee, CA (US); Ashok Bhatia, San Diego, CA (US); Yugandhar Chiniga, San Diego, CA (US); James A. Hutchison, IV, San Diego, CA (US); Wen J. New, San Diego, CA (US); Henti Tung, San Diego, CA (US); Paul T. Williamson, San Diego, CA (US)

(73) Assignee: Qualcomm Incorporated, San Diego, IL (US)

( * ) Notice: Subject to any disclaimer, the term of this patent is extended or adjusted under 35 U.S.C. 154(b) by 0 days.

(21) Appl. No.: 09/512,982

(22) Filed: Feb. 24, 2000

(51) Int. Cl.[7] .............................. H04Q 7/20; H04M 3/00
(52) U.S. Cl. ..................... 455/432; 455/434; 455/425; 455/418
(58) Field of Search ..................... 455/418, 432–435, 455/443, 405, 423, 425, 455, 456, 436, 440; 375/224

(56) References Cited

U.S. PATENT DOCUMENTS

| 5,553,243 | A | * | 9/1996 | Harrison et al. ............. 375/224 |
| 5,734,980 | A | | 3/1998 | Hooper et al. |
| 5,754,542 | A | | 5/1998 | Ault et al. |
| 5,784,693 | A | | 7/1998 | Barber et al. |
| 5,870,674 | A | | 2/1999 | English |
| 5,983,115 | A | | 11/1999 | Mizzaikovsky |
| 5,995,829 | A | * | 11/1999 | Broderick ..................... 455/418 |
| 5,999,811 | A | * | 12/1999 | Molne ......................... 455/432 |
| 6,058,309 | A | * | 5/2000 | Huang et al. ................. 455/433 |
| 6,128,489 | A | * | 10/2000 | Seazholtz et al. ............ 455/432 |
| 6,148,198 | A | * | 11/2000 | Anderson et al. ............ 455/432 |

FOREIGN PATENT DOCUMENTS

| EP | 0 951 190 A2 | * | 10/1999 | ............ H04Q/7/32 |
| WO | 9945723 | | 9/1999 | |
| WO | 0008883 | | 2/2000 | |

* cited by examiner

*Primary Examiner*—Edward F. Urban
*Assistant Examiner*—Meless Zewdu
(74) *Attorney, Agent, or Firm*—Philip R. Wadsworth; Charles D. Brown; George C. Pappas

(57) ABSTRACT

A system for facilitating the acquisition of a most desirable wireless service for a wireless phone. The system includes a scanning mechanism for periodically scanning for a signal indicative of a wireless service having a coverage area that overlaps one or more coverage areas of other wireless services. A service acquisition mechanism acquires the wireless service or one of the other wireless services based on predetermined selection criteria and the signal. More specifically, the present invention includes a wireless phone having a first mechanism for determining if a detected system, i.e., service is associated with a coverage area that overlaps one or more coverage areas of different systems. A second mechanism compares the different systems to the detected system and selects a preferred system based on the comparison. A third mechanism acquires the preferred system. In the specific embodiment, the wireless phone includes a computer that runs software for implementing the first, second, and third mechanisms.

9 Claims, 9 Drawing Sheets

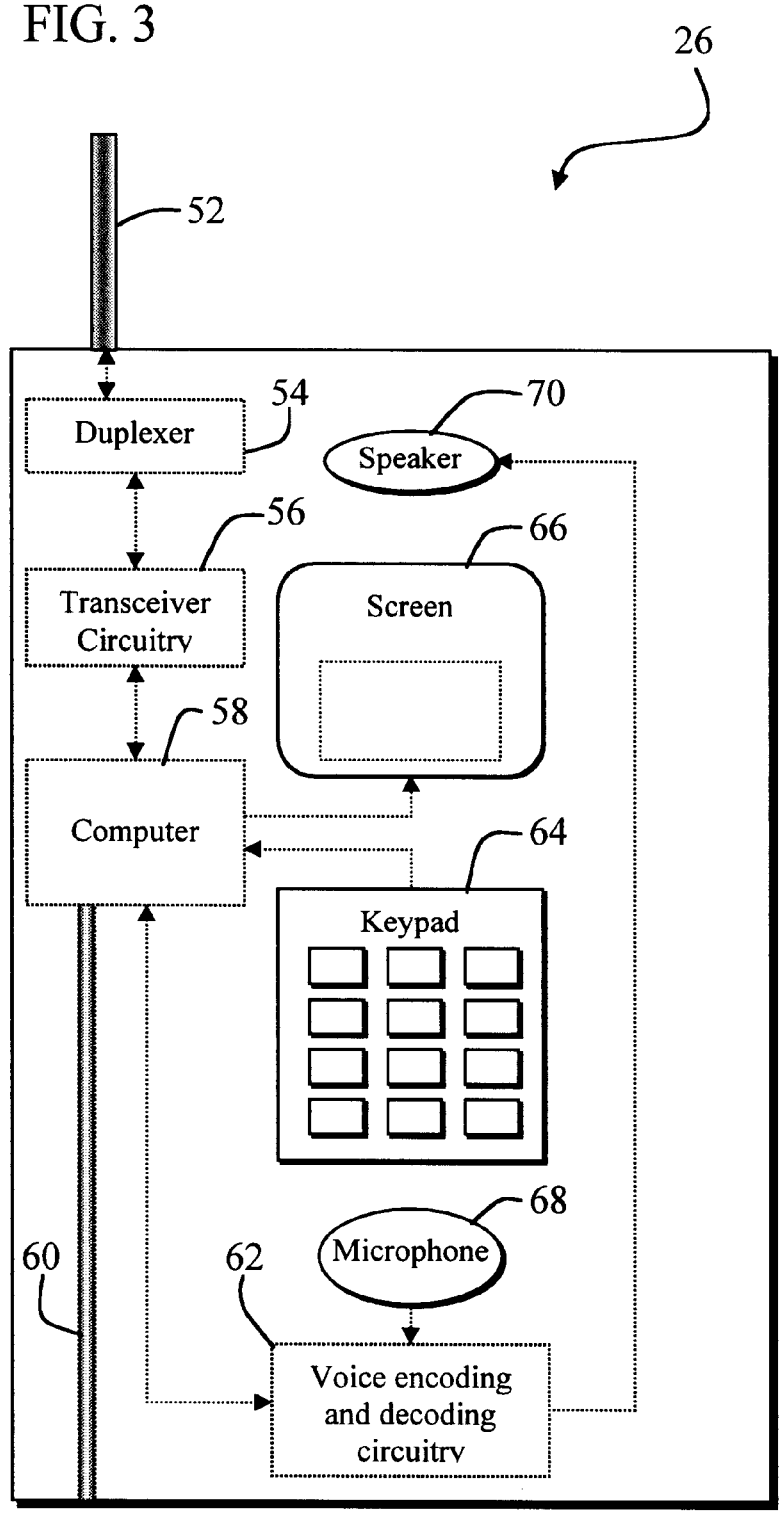

US 6,584,311 B1

TECHNIQUES FOR FACILITATING OPTIMAL SERVICE ACQUISITION

BACKGROUND OF THE INVENTION

1. Field of Invention

This invention relates to wireless communications systems. Specifically, the present invention relates to systems and methods for facilitating wireless phone service acquisition via the use of a preferred roaming list.

2. Description of the Related Art

Wireless phones and associated wireless telecommunications systems are used in a variety of demanding applications including search and rescue and business applications. Such applications demand communications systems that provide effective service to a wireless phone as it travels or roams between geographic regions.

Wireless telecommunications systems are characterized by a plurality of mobile stations (e.g. wireless phones, mobile phones, or cellular phones) in communication with one or more base stations. A signal transmitted by a mobile station is received by a base station and often relayed to a mobile switching center (MSC). The MSC in turn routes the signal to another base station, a public switched telephone network (PSTN) or to another mobile station. Similarly, a signal may be transmitted from the public switched telephone network to a mobile station via a base station and a mobile switching center.

A base station routes calls between mobile stations and a telecommunications network via a mobile switching center. Each base station governs a limited geographic region called a cell. Typically, the coverage area of a wireless telecommunications system is divided into several cells. Different communications resources such as frequencies are often allocated to each cell to maximize communications system resources. When a mobile station moves from a first cell to a second cell, a handoff is performed to assign new system resources associated with the second cell to the mobile station.

Often a particular geographic area in which wireless service is available has several cells or coverage areas. The cells may overlap and may be associated with different types of telecommunications systems such as cellular code division multiple access (CDMA) systems, cellular analog systems, personal communication system (PCS) CDMA systems, or advanced mobile phone system (AMPS) systems. For example, currently Canada has an AMPS coverage area that overlaps several different CDMA coverage areas. Each CDMA coverage area is associated with a different province.

Users often travel within and between different system coverage areas. Each system coverage area comprises one or more cells and may define a particular geographic region. A base station is often called a system. Each base station governing a particular geographic region broadcasts a system identification number (SID). The SID is detectable by the mobile station.

Upon initial power-up, a mobile station executes software to determine currently available wireless services and to acquire the most preferable available service. Mobile station manufacturers distribute mobile stations to wireless carriers such as Sprint® or Airtouch Cellular®. Each wireless carrier typically has an option to program information into the mobile station specifying the frequencies and the relative priorities of different types of services detected. For example, once the mobile station detects a SID transmitted by a base station, the mobile station may compare the SID with pre-existing information in a mobile station memory. If for example, a wireless carrier such as Airtouch provides a mobile station to a user, the programmed information may specify Airtouch base stations as representing desirable Systems and may specify certain other types of systems as non-acceptable. The wireless carriers may define particular geographic regions that comprise one or more system coverage areas, i.e., cells. The wireless carriers may establish via software, which of the coverage areas in the particular geographic region are preferable for mobile station acquisition. However, once a mobile station acquires a particular system that may extend beyond the particular geographic region, the mobile station is oblivious as to when it exits the geographic region and enters an area in which more desirable service may exist. Similarly, once a mobile station obtains service from a base station, i.e., a system, the mobile station maintains that service while inside the coverage area of that base station with that base station, even if more desirable systems exist. This may result in inefficient use of network resources and may result in inferior mobile phone performance when roaming.

Hence, a need exists in the art for an efficient system and method for searching for the availability of different and possibly more desirable wireless services and th,at accounts for movement of the mobile station through different geographic coverage areas. There is a further need for a system and method for facilitating the acquisition of the optimal service given that one or more wireless services is currently available.

SUMMARY OF THE INVENTION

The need in the art is addressed by the system for facilitating the acquisition of a most desirable wireless service for a wireless phone of the present invention. In the illustrative embodiment, the inventive system is adapted for use with a wireless phone having a computer. The system includes a scanning mechanism for periodically scanning for a signal indicative of a wireless service having a coverage area that overlaps one or more coverage areas of other wireless services. The system further includes a service acquisition mechanism for acquiring the wireless service or one of the other wireless services across different geographic regions based on predetermined selection criteria and said signal.

More specifically, the present invention includes a wireless phone that includes a first mechanism for determining if a detected service, i.e., communications system, is associated with multiple coverage areas that overlap one another. A second mechanism compares the different systems in these coverage areas to the detected system and selects a preferred system based on the comparison.

In a specific embodiment, the wireless phone includes a computer that runs software for implementing the first, second, and third mechanisms. The first mechanism includes a mechanism for providing a data structure that contains identification information for each system associated with multiple geographic regions. The identification information includes a list of system In the illustrative embodiment, the second mechanism includes a mechanism for checking if a preferred/negative indicator in the preferred roaming list in the wireless phone is set to preferred or negative for each of the different systems and/or the detected system, which are systems under comparison. The second mechanism also assigns a lowest priority to each of the systems under comparison that are associated with a negative indicator. The second mechanism also includes a mechanism for determining if the wireless phone has a forced mode or a preferred mode and for assigning a higher priority to each of the systems under comparison that correspond to the forced mode or the preferred mode. If the wireless phone is not set to a forced or preferred mode, an additional mechanism determines if the systems under comparison are code division multiple access systems or advanced mobile phone systems or a combination thereof and selects the system of the type assigned a higher priority in the data structure, which is a preferred roaming list. Finally, the invention includes a mechanism for analyzing a roaming indicator for the systems under comparison and subsequently assigning relative priorities to systems in accordance with roaming indicator status specifications detailed in the TSB58 standard.

The novel design of the present invention is facilitated by unique methods of the present invention that allow a mobile phone to detect newly available systems (known as candidate systems or target systems) and analyze the systems to determine if the mobile phone should switch to one of the newly available systems. Previously, if the coverage area of an initial wireless system overlapped the coverage areas of other perhaps more desirable systems, the mobile phone could not detect and switch to a more desirable system once service was acquired from the initial system.

BRIEF DESCRIPTION OF THE DRAWINGS

FIG. 3 is an exemplary diagram of a mobile station constructed in accordance with the teachings of the present invention.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
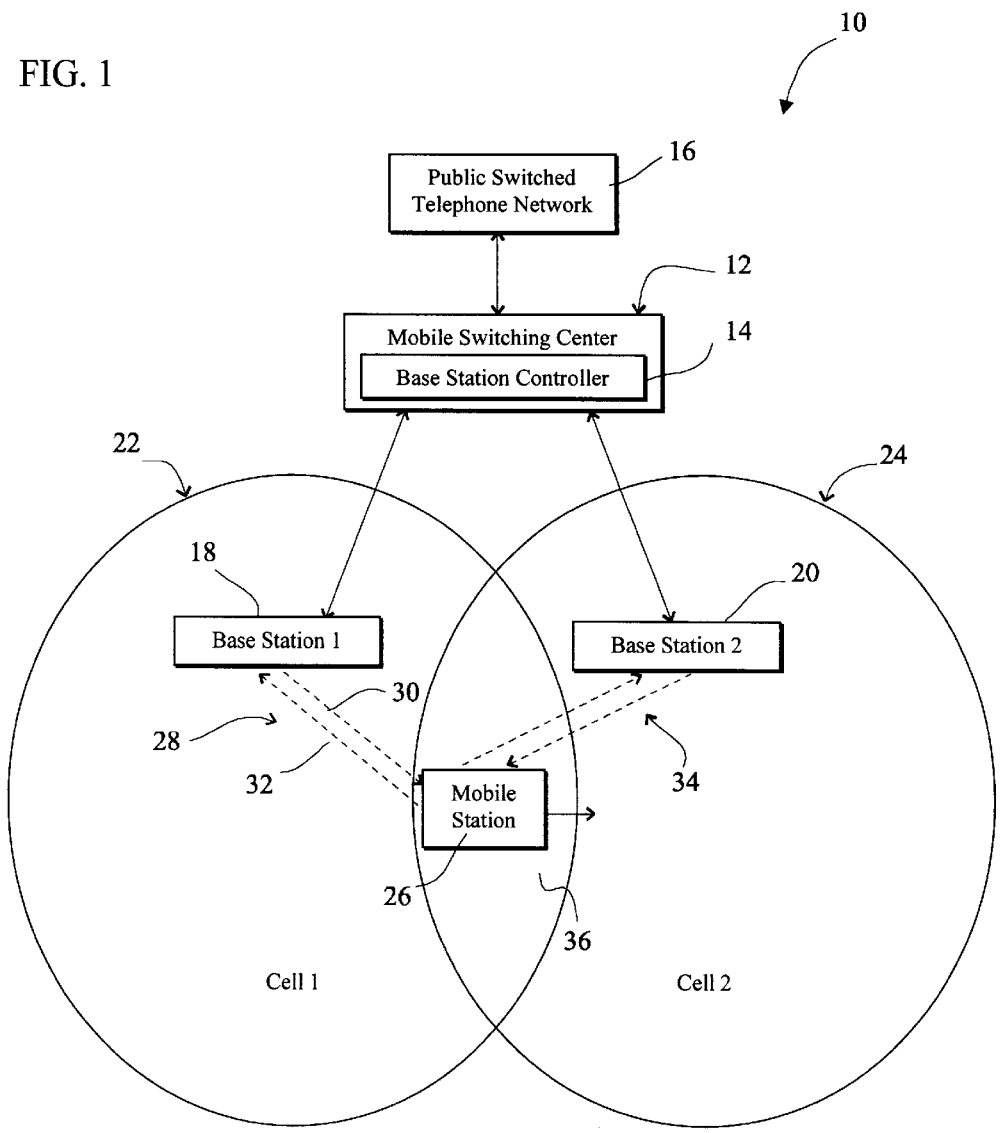
FIG. 1 is a diagram of an exemplary wireless phone system showing a first cell and a second cell.

FIG. 1 is a block diagram of an exemplary CDMA communications system 10. The system 10 includes a mobile switching center (MSC) 12 having a base station controller (BSC) 14. A public switched telephone network (PSTN) 16 routes calls from telephone lines and other networks (not shown) to and from the MSC 12. The MSC 12 routes calls from the PSTN 16 to and from a source base station 18 and a target base station 20 associated with a first cell 22 and a second cell 24, respectively. In addition, the MSC 12 routes calls between the base stations 18 and 20. The source base station 18 directs calls to the first mobile station 26 within the first cell 22 via a first communications link 28. The communications link 28 is a two-way link having a forward link 30 and a reverse link 32. Although each base station 18 and 20 is associated with only one cell, a base station often governs or is associated with several cells. For the purposes of the present discussion, the first cell 22 and the second cell 24 are CDMA systems and represent a geographic region corresponding to the union of the coverage areas of the cells 22 and 24.

When the mobile station 26 moves from the first cell 22 to the second cell 24, the mobile station 26 is handed off to the target base station 20. Handoff typically occurs in a handoff region 36 where the first cell 22 slightly overlaps the second cell 24.

In a soft handoff, the mobile station 26 establishes a second communications link 34 with the target base station 20 in addition to the first communications link 28 with the source base station 18. After the mobile station 26 has crossed into the second cell 24, it may drop the first communications link 28.

In a hard handoff, the communications link 34 is not established. When the mobile station 26 moves from the first cell 22 to the second cell 24, the link 28 to the source base station 18 is dropped and a new link is formed with the target base station 20.

The present invention accommodates several types of hard handoff including intersystem hard handoff and intrasystem hard handoff. An intersystem hard handoff occurs when a mobile station operating under the control of a given wireless telecommunications system, such as the system 10, moves outside the coverage area of the telecommunications system and is handed off to an adjacent system (not shown). Intersystem hard handoff is neighboring system is better able to serve the mobile station 26 than the current serving system 10. The neighboring system and the serving system 10 must have contiguous serving areas. Intersystem handoff can take place between two systems using the same air interface or between two systems using two different air interfaces. The present invention facilities intersystem hard handoff of a mobile station to a most desirable system.

Intrasystem hard handoff is employed in systems having multiple frequencies assigned to some base stations to efficiently utilize spectrum resources and increase the capacity of the CDMA network. Using multiple frequencies often provides advantages over other methods aimed at capacity increase such as cell splitting or cell sectorization. Intrasystem handoff can also happen between two networks of the same system using two different air interfaces.

In multiple frequency systems, hard handoff is required when a mobile station is moving from an area that has multiple frequencies to an area that has fewer frequencies. Hard handoff is also required when a mobile station is moving from an area with small load on the serving frequency to an area with high load on the serving frequency and load balancing is required.

Figure 2A:
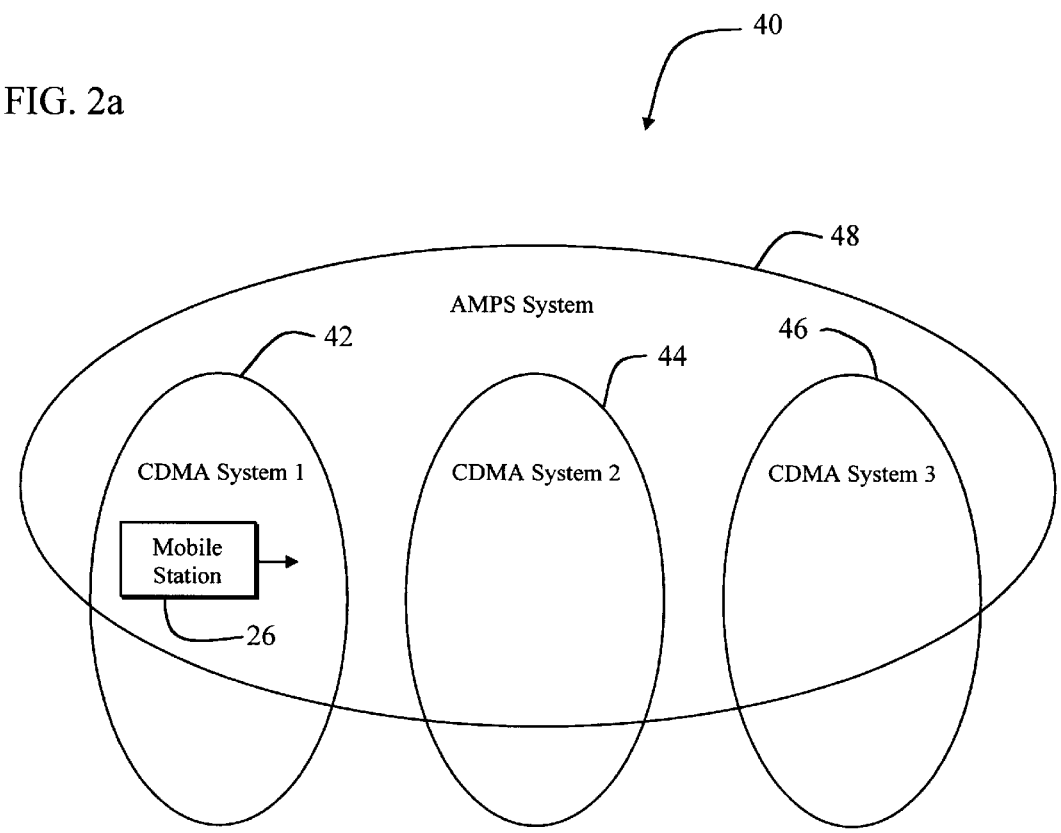
FIG. 2a is a diagram of an exemplary region having a plurality of wireless communications system coverage areas.

FIG. 2a is a diagram of an exemplary region 40 having a plurality of wireless communications system coverage areas. The region 40 includes, from left to right, a first CDMA system coverage area 42, a second CDMA system coverage area 44, and a third CDMA system coverage area 46. An advanced mobile phone system (AMPS) coverage area 48 overlaps the three CDMA coverage areas 42, 44, and 46.

In the present illustrative embodiment, each CDMA coverage area 42, 44, and 46 defines a particular geographic region such as a Canadian province as established by a particular wireless carrier. Each CDMA coverage area 42, 44, and 46 contains one or more CDMA base stations and/or mobile switching centers and associated cells. See for example, the CDMA coverage area and associated cells of the CDMA communications system 10 of FIG. 1. Similarly, the AMPS system coverage area 48 contains one or more AMPS base stations and/or mobile switching centers and is accessible in all three CDMA coverage areas 42, 44, and 46. For the purposes of the present discussion, the terms system and system coverage are used interchangeably.

Figure 2B:
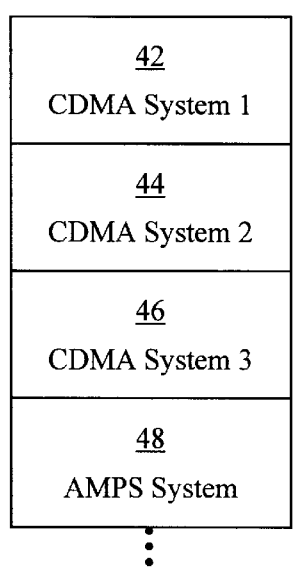
FIG. 2b is a diagram of an exemplary region having CDMA systems and AMPS systems organized into a single geographic region.

There are many ways to organize a wireless service region to achieve a particular service objective. For example, in FIG. 2a, all three CDMA systems 42, 44, and 46 and the one AMPS system 48 may be associated with, i.e., organized into one geographic region 40' as illustrated in FIG. 2b. The advantage of this arrangement is that all systems 42, 44, 46, and 48 are covered. The disadvantage, however, is that such an arrangement results in inefficient searches for systems that are not available in the physical location of the mobile station 26. For example, if the mobile station 26 is located in the first CDMA coverage area 42 as shown in FIG. 2a, the mobile station 26 may unnecessarily scan for signals and services offered by the third CDMA system 46.

Figure 2C:
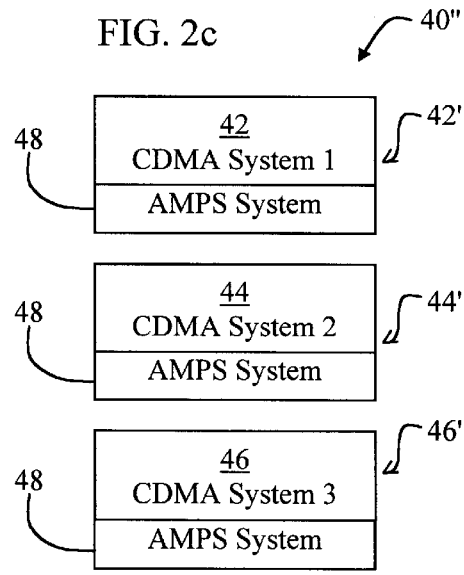
FIG. 2c a diagram of an exemplary region that is partitioned into three geographic regions, each region having both an AMPS system and a CDMA system.

With reference to FIG. 2c, to reduce unnecessary searches by the mobile station 26 for signals from communications systems outside the coverage area of the mobile station 26, an exemplary region 40" is partitioned into three geographic regions. The three geographic regions include a first region 42' that includes the first CDMA system coverage area 42 and the AMPS system coverage area 48, a second region 44' that includes the second CDMA system coverage area 44 and the AMPS system coverage area 48, and a third region 46' that includes the third CDMA system coverage area 46 and the AMPS system coverage area 48. When the mobile station 26 is located in the first geographic region 42', the mobile station 26 may scan for and obtain service from either the first CDMA system 42 or the AMPS system 48.

Partitioning the region 40" into the three geographic regions including the region 42', the region 44', and the region 46', enhances the efficiency with which the mobile station 26 searches for signals from the systems 42, 44, 46, and 48. If the mobile station 26 is located in the second region 44', it will then only search for signals from the CDMA system 44 and the AMPS system 48 and not the first CDMA system 42 nor the third CDMA system 46.

The mobile station 26 must track the current geographic region to facilitate access to any one of the CDMA systems 42, 44, or 46 because the systems 42, 44, and 46 are unique to the geographic regions represented by the union of the system coverage areas 42 and 48, 44 and 48, and 46 and 48.

Alternatively, if the mobile station 26 is getting service from the AMPS system 48, it is unaware of what CDMA service is available in its current location.

Conventionally, the first geographic region 42' in which the AMPS system 48 is listed (such as in memory on the mobile station 26) is assumed to be the geographic region in which the mobile station 26 is physically located. This can be incorrect if the mobile station 26 is not in the first geographic region 42' or if it is traveling out of the first geographic region 42'.

A multiple geographic system is a wireless communications system that provides service to multiple geographic regions. For example, the AMPS system 48 is considered a multiple geographic system because it provides service to the geographic regions 42', 44', and 46'.

FIG. 3 is an exemplary diagram of a mobile station 26 constructed in accordance with the teachings of the present invention. The mobile station 26 is a wireless phone that includes an antenna 52 connected to a duplexer 54. The duplexer 54 is connected to transceiver 56 and the transceiver 56 is connected to a computer 58. The computer 58 is connected to a data interface adapter 60, voice encoding and-decoding circuitry 62, a keypad 64, and a screen 66. The voice encoding and decoding circuitry 62 is connected to a microphone 68 and a speaker 70.

In operation, the antenna 52 transmits and receives signals via the duplexer 54. The duplexer 54 facilitates sharing of resources of the antenna 52 between transmit and receive functions. The transceiver 56 includes transmit circuitry for transmitting signals such as encoded voice signals or service negotiation signals via the antenna 52 and duplexer 54. The transceiver 56 also includes receive circuitry for receiving signals such as service negotiation messages or encoded voice signals via another phone, base station, or mobile switching center. The transceiver 56 also includes downconversion circuitry required to convert receive signals to digital baseband signals in preparation for processing via the computer 58. In addition, the transceiver 56 includes upconversion circuitry required to convert transmit signals from digital baseband signals to radio frequency signals in preparation for transmission via the antenna 52.

A user may initiate a call by dialing a number via the keypad 64. The computer 58 negotiates a service connection with an available wireless service provider via the transceiver 56, the duplexer 54, and the antenna 52. When service is established, the user's voice is input to the microphone 68, encoded by 58, transceiver 56, duplexer 54, and the antenna 52. Similarly, received voice messages are decoded by the voice encoding and decoding circuitry 62 and provided as voice via the speaker 70.

The data interface connection 60 allows software running on the computer 58 to be upgraded and/or changed. In the present specific embodiment, the processor 58 includes an 80186 processor.

For clarity, additional circuitry such as clocking circuitry and power supplies are not shown in the mobile station 26, but those ordinarily skilled in the art will know where and how to include the requisite additional circuitry.

Figure 4:
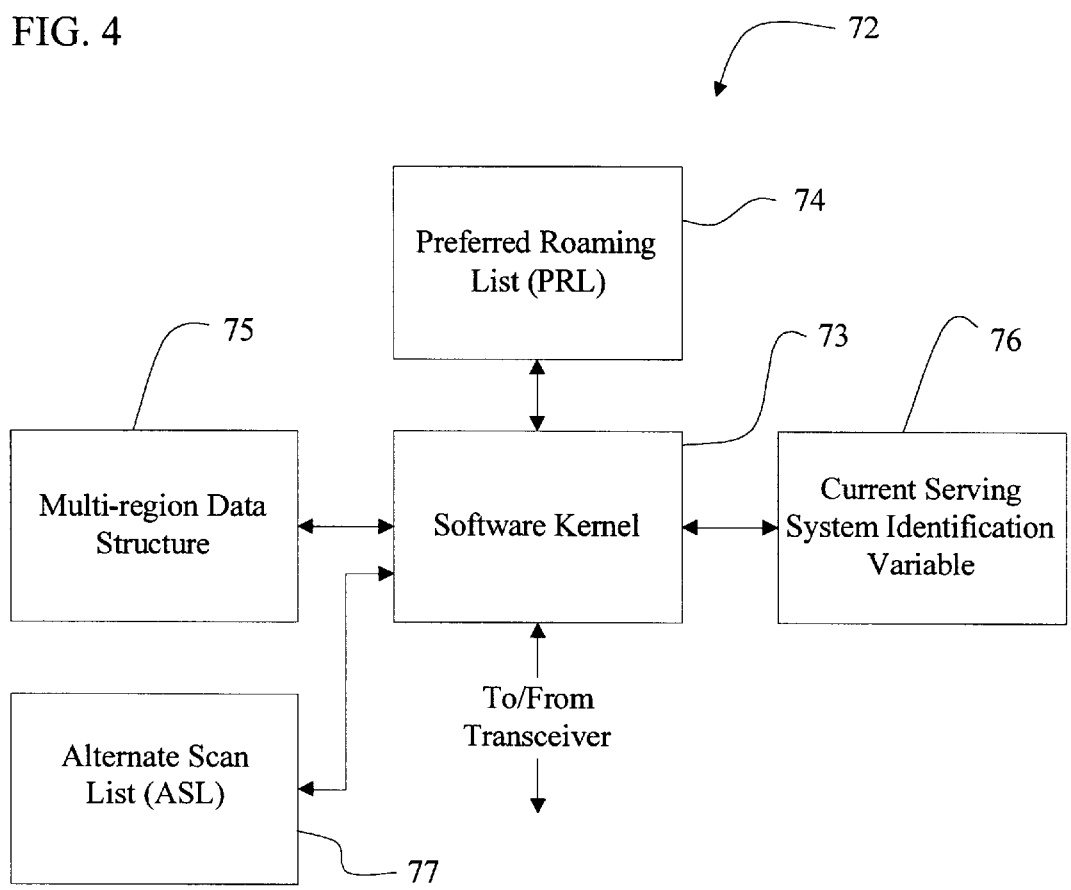
FIG. 4 is a block diagram showing key functional software elements of the system for facilitating mobile station acquisition of an optimal wireless communications system of the present invention.

FIG. 4 is a block diagram showing key functional elements of a system 72 for facilitating mobile station acquisition of an optimal wireless communications system of the present invention. In the preferred embodiment, the system 72 is implemented in software running on the computer 58 of FIG. 3.

The system 72 includes a software kernel 73 in bi-directional communication with a preferred roaming list 74, a multi-region data structure 75, a serving system identification variable 76, and an alternate scan list (ASL) 77. The kernel 73 also receives input from and provides input to the transceiver 56 of FIG. 3.

The preferred roaming list 74 includes information pertaining to existing communications systems and associated services and includes geographic information that may be used to determine overlapping system coverage areas.

The multi-region data structure 75 includes a list of all of the systems in the preferred roaming list 74 that have SIDs listed for multiple geographic regions, i.e., the data structure 75 includes information pertaining to systems that overlap the coverage areas of different systems. A multi-region data structure may be implemented in accordance with and with reference to FIG. 2c, which shows that the region 48 (corresponding to the AMPS system 48 and associated coverage area) is available in each of the three regions 42', 44', and 46'.

The alternate scan list 77 contains a listing of more preferred services that are associated with the serving system. The serving system identification variable 76 maintains a positive identification of the system currently employed by the mobile station 26 of FIG. 3, i.e., the serving system.

In operation, with reference to FIGS. 3 and 4, the kernel 73 periodically scans for newly available wireless communications systems. When a newly available system is detected, the kernel 73 checks to see if the newly detected system and/or the current serving system are listed in the multi-region data structure 75. If the newly detected system and/or the current serving system are listed in the multi-region data structure 75, then the mobile station 26 uses the multi-region data structure 75 and generates a list of services that are more preferred than the serving system, which is stored in the ASL 77. The use of the multi-region data structure 75 limits the number of scanning operations required by the mobile station 26 to determine the optimal available preferred service.

The software kernel 73 can control the transceiver 56 of FIG. 3 to facilitate the mobile station acquisition of a most desirable system selected from the ASL 77 in accordance with predetermined selection criteria as is discussed more fully below.

Figure 5:
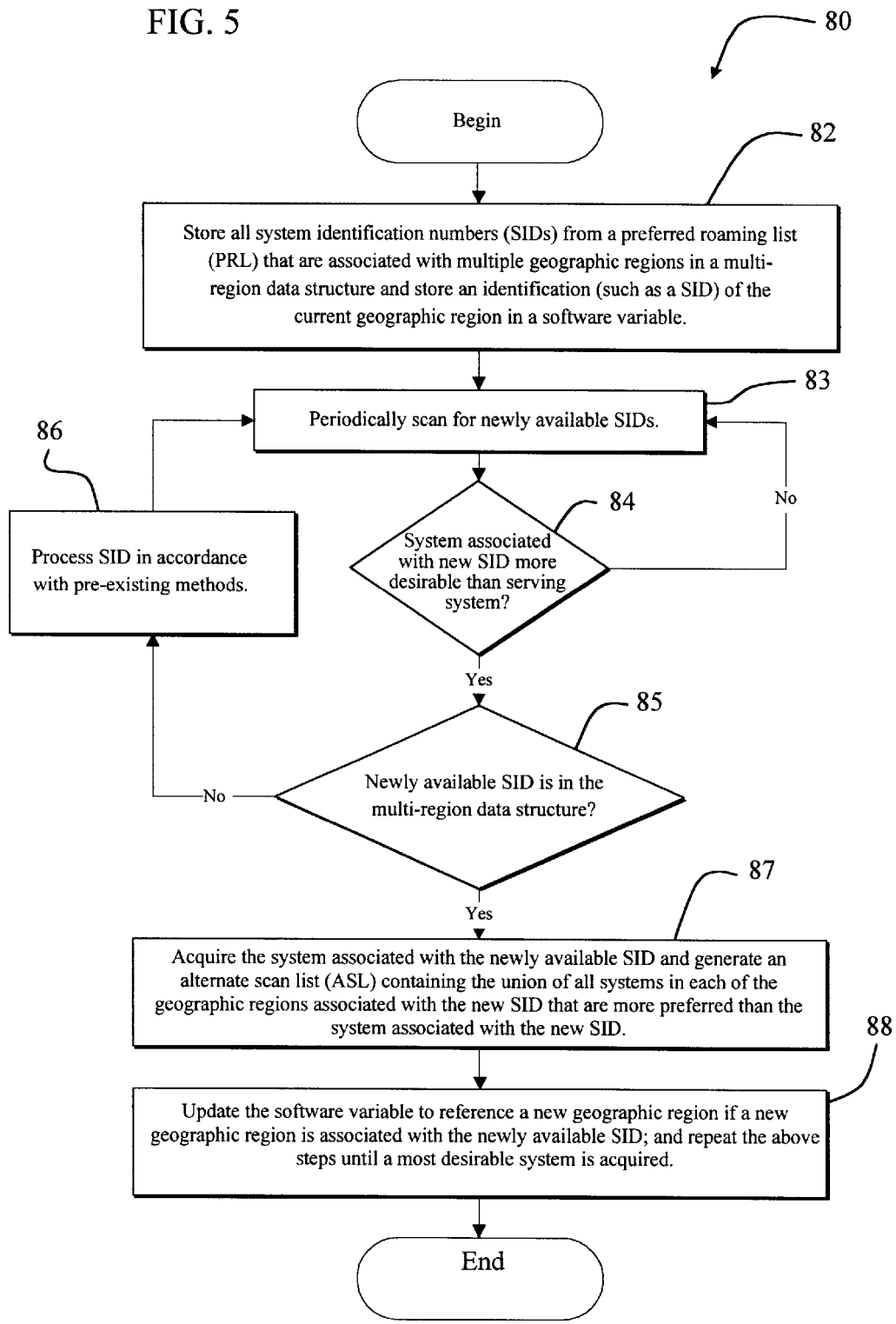
FIG. 5 is a flow diagram of software for allowing the mobile station of FIG. 3 to acquire service from a most desirable communications system.

FIG. 5 is a flow diagram of an alternative software embodiment 80 for allowing the mobile station 26 of FIG. 3 to acquire service from a most desirable communications system. In the preferred embodiment, the software 80 is implemented in software running on the computer 58 of FIG. 3, however, those skilled in the art will appreciate that the software 80 may be implemented in hardware without departing from the scope of the present invention.

With reference to FIGS. 3, 4 and 5, in an initial data structure step 82, special service acquisition software running on the computer 58 of FIG. 3 employs the, multi-region software data structure 75 of FIG. 4 to track all wireless communications systems having system identification numbers (SIDs) associated with multiple geographic regions. The multi-region data structure 75 resides in random access memory (RAM) in the software-enhanced computer 58 of FIG. 3 and is created every time a mobile station 26 powers up and/or when a new PRL 74 is loaded into the computer 58.

The variable 76 of FIG. 4 maintains system identification information pertaining to the current serving system. The software references the PRL 74 of FIG. 4, which maintains information about different types of wireless communications systems and their associated SIDs. The PRL 74 is constructed in accordance with the teachings of U.S. Patent Application Serial No. PREFERRED SYSTEM SELECTION, assigned to the Assignee of the present invention, and incorporated herein by reference. SIDs associated with multiple geographic regions are collected in the data structure 75.

Upon power-up, the mobile station 26 builds the multi-region data structure. It subsequently scans for available service based on existing logic in the wireless phone 26. Once the serving system is acquired, the present invention obtains the more preferred service as discussed more fully below.

Control is passed from the initial data structure step 82 to a scanning step 83 where the mobile station 26 periodically scans for newly available SIDs. After each scan in the scanning step 83, the special service acquisition software checks if a newly acquired SID corresponding to a different wireless communications system other than the current serving system is more preferred than the serving system. The serving system is the system currently providing service to the mobile station 26.

If a new SID is more desirable as determined in a SID checking step 84 (described more fully below), control is passed to a multi-region checking step 85 where the special service acquisition software determines if the newly available SID is associated with a multiple geographic region by checking the multi-region data structure 75. If the SID is not associated with a multiple geographic region, control is passed to a SID-processing step 86 where the newly detected SID is processed in accordance with pre-existing methods and after which control is passed back to the scanning step 83.

If the SID is associated with a multiple geographic region and is in the multi-region data structure 75, control is passed to an ASL-generating step 87. In the preferred embodiment, the ASL 77 is generated first upon initial phone power-up and may be employed in the SID checking step 84 to help determine if the system associated with the newly acquired SID is more preferred than the current serving system.

In the ASL-generating step 87, the service acquisition software acquires the system associated with the newly available SID and generates the ASL 77, which contains all systems in the multi-region data structure 75 that are more preferred than the system associated with the newly available and acquired SID. The more preferred services, i.e., systems, may be selected in accordance with the order occurrence of the associated SIDs in the PRL 74. Subsequently, software sets or marks the system associated with the newly detected SID as the serving system.

In the SID checking step 84, the most desirable system is selected from available systems. The available systems include the current serving system and any newly detected and acquired systems. The selected system is then acquired. The software 80 is repeated beginning with the scanning step 83 until a most desirable system is acquired and set as the serving system.

In the SID checking step 84, the highest priority system that is detected and acquired in the scanning step 83 is selected to be the next serving system if it has a higher priority than the current serving system as determined via methods of the present invention as discussed more fully below. The current serving system is specified in the variable 76. The selection method differs when the newly acquired system is in the same geographic region as the current serving system or when they are in separate geographic regions, as discussed more fully below.

When the newly detected and acquired system(s) is associated with a separate geographic region than the region associated with the current serving system, the highest priority system is determined in accordance with a special system selection method and associated selection criteria as is discussed more fully below with reference to FIG. 7. If the newly detected and acquired system(s) are associated with the same geographic region, the priority between systems may be selected in accordance with relative position of the corresponding SIDs in the PRL 74, with SIDs listed with a "higher" identifier being associated with more desirable systems. The variable 76 that maintains identification information pertaining to the current serving system is updated to contain information pertaining to the newly acquired serving system.

With reference to FIGS. 2, 3, 4 and 5, the mobile station 26 (see FIG. 3) maintains the' multi-region data structure 75 that includes SIDs corresponding to the AMPS system 48, the first CDMA system 42, the second CDMA system 44, and the third CDMA system 46. If the mobile station 26 travels into the AMPS system coverage area 48 and detects a SID corresponding to the AMPS system 48, the unique software of the present invention forms an ASL 77 that includes the CDMA systems 42, 44, and 46. Systems in the ASL 77 are ranked according to the order of geographic regions in which they appeared. The AMPS system 48, namely, the first CDMA system 42, the second CDMA system 44, and the third CDMA system 46. The scan is limited to systems in the multi-region data structure 75 associated with the detected multi-region, i.e., the AMPS system 48, to optimize scanning efficiency.

If the mobile station 26 enters the first CDMA system coverage area 42, the priority, i.e., preference status of the CDMA system 42 is compared to the current serving system, i.e., the AMPS system 48. The mobile station 26 then switches to the CDMA system 42 if it is preferable as determined by the unique system selection method of the present invention as is discussed more fully below.

The software 80 employs the multi-region data structure 75 to track all multi-region SIDs in a PRL 74. SIDs collected in the multi-region data structure 75 are listed more than once in the PRL. When a SID is detected and acquired, the software 8Q searches the multi-region data structure 75 to determine if the acquired SID is associated with multiple geographic regions in the PRL 74. If the SID is found in the multi-region data structure 75, then information stored in the multi-region data structure 75 is used by the software to create the ASL 77. If the acquired SID is not found in the data structure 75, the SID is either associated with a single geographic region or does not exist in the PRL 74. In this case, the software employs pre-existing strategies to process the detected SID for the purpose of generating an ASL 77.

Figure 6:
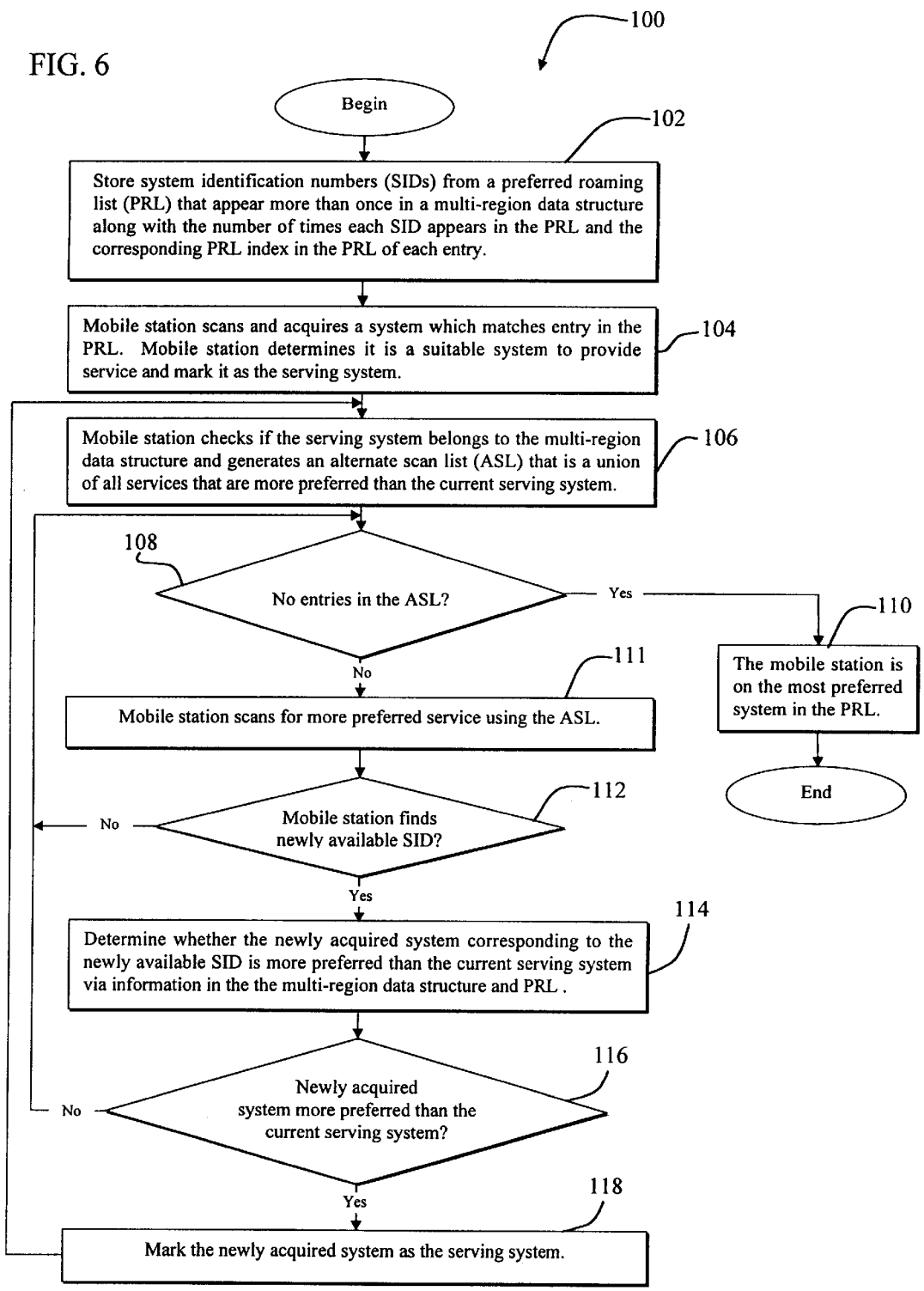
FIG. 6 is a flow diagram of a preferred embodiment of the software of FIG. 5 adapted for use with the mobile station of FIG. 3.

FIG. 6 is a flow diagram of a preferred embodiment 100 of the software 80 of FIG. 5 adapted for use with the mobile station 26 of FIG. 3. With reference to FIGS. 3, 4, and 6, in an initial SID-storing step 102, SIDs from the PRL 74 that appear more than once are stored in the multi-region data structure 75 along with the number of times each SID appears in the PRL 74 and the corresponding PRL index.

Subsequently, in a system-scanning step 104, the mobile station 26 scans and acquires a system that matches an entry in the PRL. If the newly acquired system is a system that can provide service to the mobile station 26, the mobile station 26 sets the newly acquired system as the serving system.

Next, in a system-checking step 106, the mobile station 26 checks if the serving system is in the multi-region data structure 75 formed in step 102. If the serving system is in the multi-region data structure 75 then software running on the multiple geographic regions that contain the serving system SID and that are more preferred than the current serving system. Subsequently, control is passed to an ASL-checking step 108 if the serving system belongs to the multi-region data structure 75. If the serving system is not part of a multi-region or is not listed in the multi-region data structure, the software 80 employs pre-existing strategies to generate the ASL 77.

In the ASL-checking step 108, if there are no entries in the ASL 77 then the mobile station 26 is considered to be on the most preferred system in the PRL 74. Otherwise, control is passed to a second scanning step 111. In the second scanning step 111 the mobile station 26 scans for a more preferred system listed in the ASL 77.

In a subsequent detection-checking step 112, if the mobile station 26 finds a newly available SID and acquires the system associated with the newly available SID, control is passed to a subsequent step 114. Otherwise, control is passed back to the ASL-checking step 108.

In the step 114, the mobile station 26 determines if the newly acquired system is more preferred than the current serving system via information in the multi-region data structure 75 and the PRL 74. The resulting priority is checked in a subsequent priority-checking step 116.

In the priority-checking step 116, if the newly acquired system is more preferred than the current serving system then control is passed to a marking step 118, where the newly acquired system is marked or set as the serving system and control is passed back to the system checking-step 106. Otherwise, control is passed back to the ASL-checking step 108.

The steps 106, 108, 111, 112, 114, 116, and 118 form three loops, including a loop between the steps 108, 111, and 112, a loop between the steps 108, 111, 112, 114, and 116, and a loop between the steps 106, 108, 111, 112, 114, 116, and 118. All of the loops are exited when there are no more preferred entries in the ASL as determined in the ASL-checking step 108.

Figure 7:
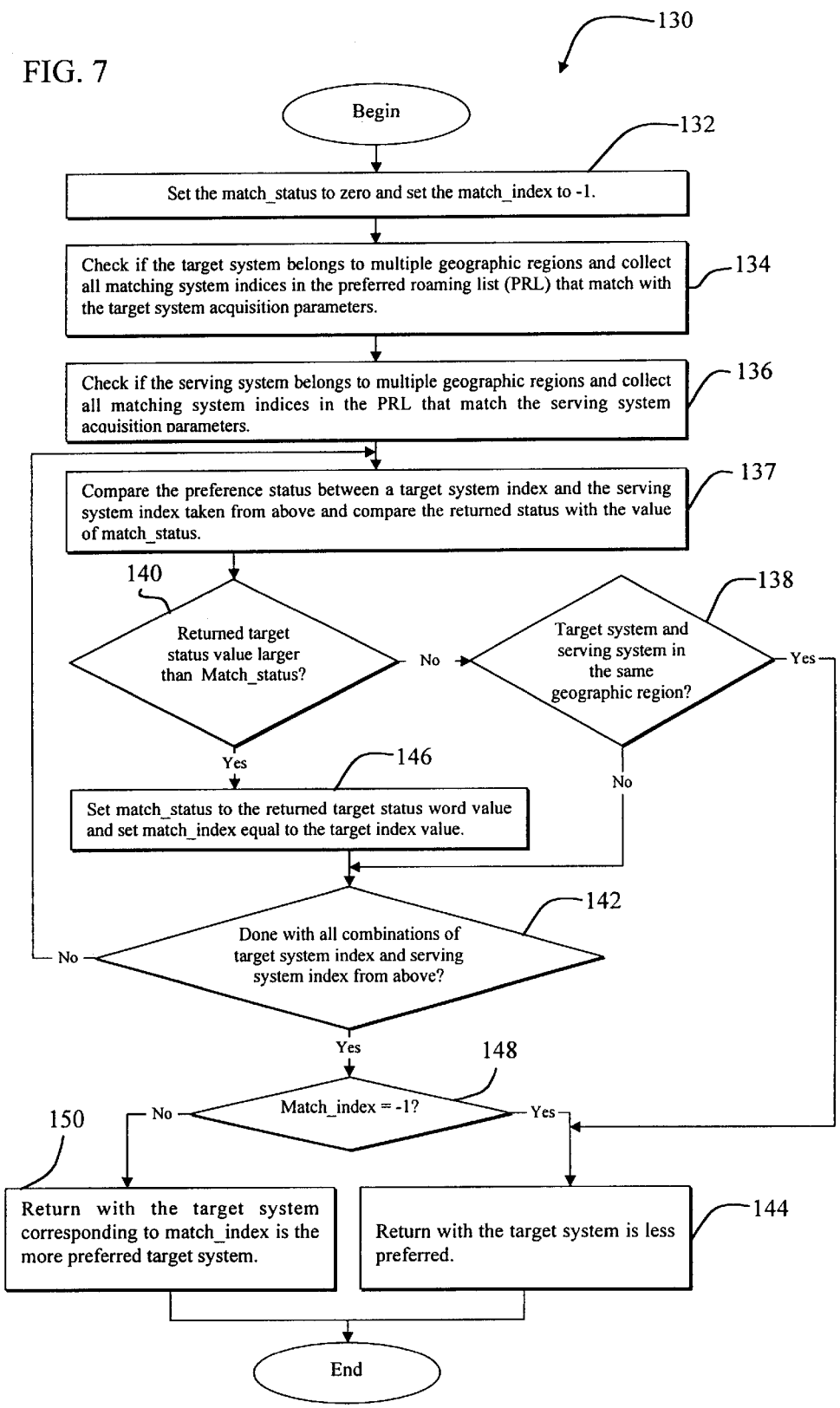
FIG. 7 is a flow diagram of a software routine of the present invention for comparing the preference status of a target system and the serving system regardless of whether or not the target system or serving system are associated with multiple geographic regions and setting the more desirable system as the serving system.

FIG. 7 is a flow diagram of a software routine 130 of the present invention. The software routine 130 compares the preference status between a serving system and a target (newly acquired) system regardless of whether the serving system or the target system belongs to multiple geographic regions. After comparing all possible combinations of the serving system and target are more desirable are associated with status words with larger numerical values. By recording the largest status word that is returned and the associated target system index, the routine 130 determines if the target system or the serving system is more preferred.

In an initial status-setting step 132, a variable match_status is initialized to zero and a variable match_index is set to –1. The variable match_status stores a returned status word. After a comparison between a target system and a serving system, the value of the variable match_status is updated and assigned the value of the preference status of the target system if the target system is more preferred than the serving system. The match_index is a variable that stores the target system index associated with the largest returned non-zero status word. If the target system is less preferred than the serving system, a zero status word is returned. Both the match_status and the match_index remain unchanged in these cases.

Subsequently, in a first region-checking step 134 the multi-region data structure 75 is checked for entries corresponding to the target system to determine if the target system is a multi-region system. All system indices that match the service acquisition parameters of the target system are collected from the PRL 74.

Similarly, in second region-checking step 136, all the system indices in the PRL 74 that match the serving system acquisition parameters are collected, and the multi-region data structure 75 is checked for entries corresponding to the serving system to determine if the target system is a multi-region system.

Subsequently, the routine 130 enters a loop in which each combination of target system index (associated with each of the matching target systems as determined in step 134) and serving system index (associated with each of the matching serving systems as determined in step 136) is compared to determine a status associated with each comparison.

The loop includes a comparison step 137 in which the preference status associated with the index of the target system and the serving system is compared. The step 137 returns either zero or the largest preference status, which is the, value of the preference status of the target system. For example, after the comparison, a status word is returned. The status word is either zero or non-zero. A zero status word value indicates that the target system is less indicates that the target system is more preferred and the magnitude of the value is a measure of the desirability of the target system.

In a subsequent status-decision step 140, if the target status is larger than match_status, then the variable, match_status is set to the value of the target status word value returned in step 137, and the value of the variable match_index is set equal to the target index value. The status word is compared with the value of the variable match_status to determine if the results of the comparison are better than the previous comparisons and should be recorded, i.e., the status word is larger than the value of the variable match_status. If the results are better, the stored match_status is updated to the value of the status word and the corresponding target system index is recorded in match_index in a subsequent status-setting step 146.

After the status-setting step 146, control is passed to a combination-checking step 142. In the combination-checking step 142, the routine 130 determines if all combinations of target system indices and serving system indices have been checked. If all combinations have not yet been checked, then control is passed back to the comparison step 137. This process continues until all possible combinations of the serving system index and target system indices are processed as determined in the combination-checking step 142. Subsequently, control is passed to a match_index-checking step 148.

If the target system is less preferred as determined in the status-decision step 140, control is passed to a region-checking step 138 to determine if the target system and the serving system are located in the same geographic region. If the target system and the serving system are associated with the same geographic region, a less preferred target system result is returned and the routine 130 is complete. Otherwise, control is passed back to the combination-checking step 142.

In the subsequent match_index-checking step 148 if the value of the variable match_index is −1, i.e., matches its initial value set in the initial step 132, then the target system is less preferred than the current serving system. The more preferred system is subsequently acquired. Otherwise, the target system corresponding to match_index is returned as the more preferred target system in a first returning step 150.

At the end of the comparison loop comprising the steps 137, 138, 140, system index is located. If so, then the software routine 130 returns with a target system index, which is more preferred than the current serving system index. Otherwise, the software returns a result indicating that the target system is less preferred.

Figure 8:
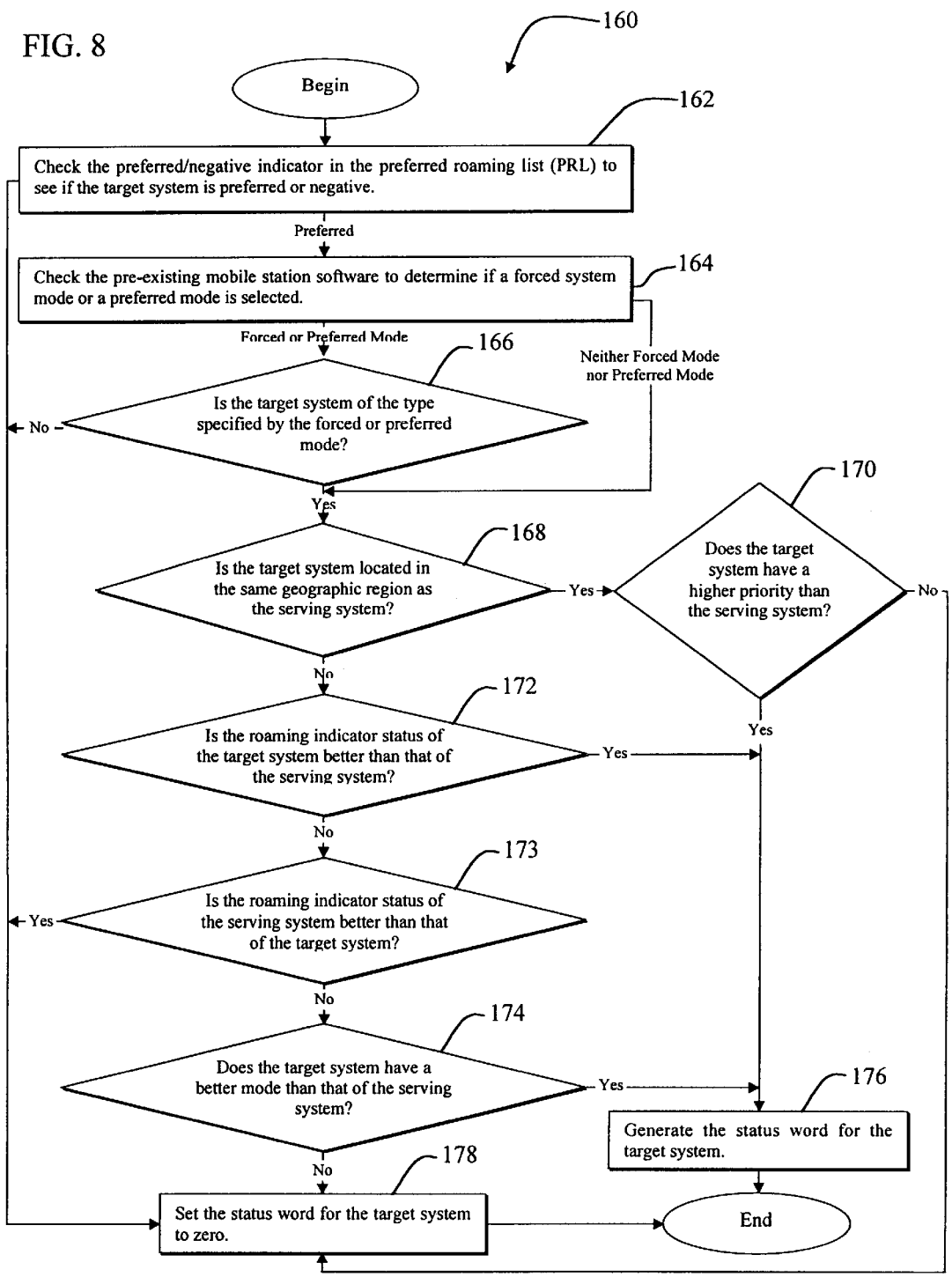
FIG. 8 is a flow diagram of software for assigning a preference status to a target system for use by the software routine of FIG. 7 using a 16-bit status word.

FIG. 8 is a flow diagram of software 160 for assigning a preference status to a target system for use by the software routine 130 of FIG. 7. The software 160 runs on the computer 58 of the mobile station 26 of FIG. 3. This software 160 accepts a pair of system indices comprising the index of the target system and the index of the serving system. It compares two indices using several criteria to determine if the target system or the serving system is more preferred. If the target system is more preferred, then a non-zero status word is returned. Otherwise, a status word with a zero value is returned.

Those skilled in the art will appreciate that the system selection software 160 may be used to make multiple comparisons between several systems to establish a relative priority between the systems. The system selection software 160 is adapted for use with the step 114 of the software 100 of FIG. 6.

In an initial indicator-checking step 162, the preferred/negative status of the target system in the PRL 74 is checked. If the preferred/negative indicator is negative the target system is less preferred than the current serving system.

Subsequently, in a mode-checking step 164, the wireless phone 26 is checked for the presence of a forced or preferred mode. If the phone 26 has a forced or preferred mode, then control is passed to mode-determination step 166 where the mode of the target system is compared with the forced or preferred mode set in the wireless phone 26. If the phone does not have a forced or preferred mode set, then control is passed to a region-checking step 168.

If in the mode-determination step 166 the software 160 determines that the mode of the target system is not of the type specified via the forced or preferred mode then control is passed to a first word-generating step 178 where the status word associated with the target system is set to zero and the software 160 is complete. In this case, the target system is less preferred than the serving system. If the mode of the target system matches the type of system specified by the forced or preferred mode then control is passed to the region-checking step 168.

In the region-checking step 168, the software 160 determines if the target system is located in the same geographic region as the serving system via information stored in the PRL 74 and the multi-region data structure 75. If the target system and the serving system are associated with the same geographic region, then control is passed to a step 170.

In the step 170, the software 160 determines if the target system has a higher priority than the serving system via information stored in the PRL 74. If the target system has a higher priority, as specified via a priority indicator in the PRL 74, then control is passed to a second word-generating step 176, where the value of the status word for the target system is generated. In this case, the target system is more preferred.

If the target system has a lower priority as determined in the step 170, then control is passed to the first word-generating step 178 and the value of the status word is set to zero and the software 160 is complete. In this case, the target system has a lower priority than the serving system.

If in the, region-checking step 168 the software 160 determines that the target system and serving system are located in different geographic regions then control is passed to a first roaming-indicator-checking step 172. In the first roaming-indicator-checking step 172 the roaming indicator associated with the target system is compared to the roaming indicator associated with the serving system. The comparison is based on the indicator values specified in the telecommunications industry standard TSB58. The comparison is based on the order of roaming indicator "OFF", "ON", and "FLASH". A system with the roaming indicator "OFF" is more preferred than a system with indicator "ON" or "FLASH". A system with a roaming indicator set to "ON" is more preferred than system with a roaming indicator set to "FLASH". The comparison criteria are extended as the number of roaming indicator states grows in the TSB58. If the target system has a more preferred roaming indicator status, then control is passed to the second word-generating step 176, where the status word for the target system is generated, and the target system is considered more preferred than the serving system.

If in the first roaming-indicator-checking step 172 the software 160 determines that the roaming indicator status of the target system is not more desirable than the roaming indicator status of the serving system, then control is software 160 determines if roaming indicator status of the serving system is preferable to that of the target system, and if so, control is passed to the first word-generating step 178, where the value of the status word of the target system is set to zero and the target system is considered less preferred than the serving system. Otherwise, control is passed to a mode-comparison step 174.

If the roaming indicator status of the target system and roaming indicator status of the serving system are equal, the modes of the target system and the serving system are compared in the mode-comparison step 174. A CDMA mode is considered more preferable than an AMPS mode. If the target system is associated with a more preferable mode than the serving system, then control is passed to the second word-generating step 176 and the target system is considered more preferred than the serving system. Otherwise, control is passed to the first word-generating step 178, and the target system is considered to be less preferred than the serving system.

Before the software 160 returns, if the target system is more preferred, a status word is generated in the second word-generating step 176 based on the characteristics of the target system. The status word is a 16-bit word with bit fields assigned to represent the different characteristics of the target system. The more significant bit field is assigned to represent features that are more important and have more weight in the preference decision process.

Previously, for systems not co-located in a geographic region, no comparison criteria existed to determine a relative preference status between systems. Systems more preferred than the current serving system were ignored if they were not associated with the same geographic region as the current serving system. The system selection software 160 overcomes these previous limitations and provides comparison method and associated criteria for systems not in the same geographic region based on the following items in priority order:

1. Preferred/negative indicator: A system with a preferred indicator is more preferred than one with a negative indicator.
2. Forced mode or preferred mode (CDMA/AMPS). If a forced mode or preferred mode is chosen, any system not matching the forced or preferred mode is excluded from further consideration.
3: Roaming indicator: A non-roaming status is more preferred than all other roaming indications. For other roaming indications priority is set according to a roaming indicator status specified in the TSB58 standard.
4. System default mode: If a forced mode or preferred mode is specified, systems under comparison should all be of that mode. Otherwise, systems operating on CDMA are more preferred than systems operating on AMPS.
5. If all of the above criteria specified in items 1 through 4 are satisfied for systems under comparison, the systems under comparison are considered equal in preference status.

Figure 9:
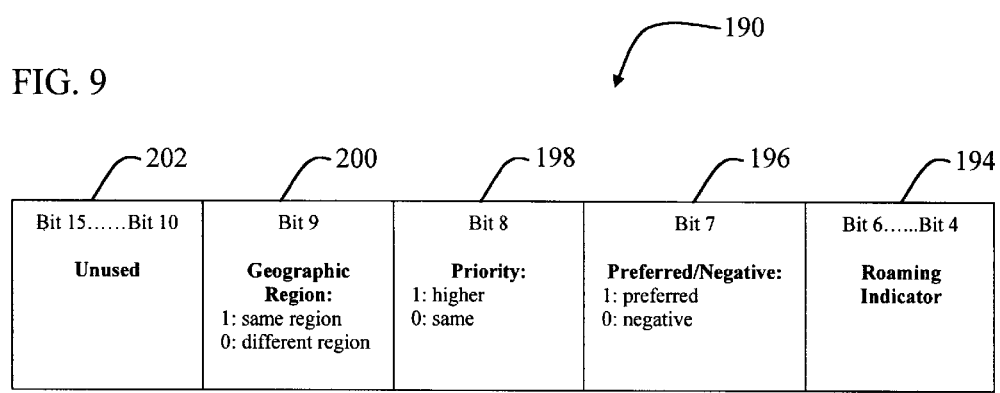
FIG. 9 is a diagram illustrating the contents of various bits of the 16-bit status word employed in the software of FIG. 8.

FIG. 9 is a diagram illustrating the contents of various bits of the 16-bit status word 190 employed in the software of FIGS. 7 and 8. The status word 190 includes a first block of bits 192 that includes bit 0 through bit 3, which specify mode. More preferred modes are associated with a higher value specified in the first block of bits 192.

As A second block of bits 194 includes bit 4 through bit 6. The second block of bits 194 specifies the roaming indicator field. A more preferred roaming indicator status is associated with a higher value for the second block of bits 194. For example, the "OFF" indicator has a higher value than the "ON" indicator and a corresponding status word will have a higher value for the second block of bits 194 if the roaming indicator is "OFF".

A third block 196 includes bit 7 which is the preferred/negative field. A fourth block 198 represents bit 8, which is a priority indicator field. A fifth block 194 represents bit 9, which is a geographic region indicator field. A sixth block 202, which includes bit 10 through bit 15 is unused in the present specific embodiment.

The size of the status word and the size of each individual field corresponding to each block 192, 194, 196, 198, 200, and 202 are application-specific and may be increased or decreased as needed to meet the demands of a given application.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention. Accordingly,

What is claimed is:

1. In a mobile station utilizing a preferred roaming list (PRL) and a multi-region data structure (MRDS), where the MRDS includes system identification numbers (SIDs) from the PRL, a method comprising:

scanning and acquiring a system to provide service in a current geographic region;

marking the acquired system as a current serving system, the current serving system having a SID matching an entry in the PRL;

detecting that the current serving system matches an entry in the MRDS;

updating, in response to the detecting and without modification to the PRL, an alternate scan list (ASL), the ASL defining a current union of all SIDs whose corresponding systems are more preferred than the system currently marked as the current serving system;

scanning, after generating the ASL, to detect a newly available SID using the ASL, the newly available SID associated with a system servicing a geographic region which overlaps the current geographic region of the current serving system, the scanning involves periodically scanning for a signal indicative of a wireless service;

acquiring the system servicing the overlapping geographic region when the newly acquired SID is more preferred than the SID of the system marked as the current serving system, using the MRDS and the PRL, the acquiring involving at least one of an intersystem hard handoff and an intrasystem hard handoff of the mobile station to a most desirable system;

marking the acquired system servicing the overlapping geographic region as the current serving system to redefine the current serving system; and re-updating the ASL using the newly acquired SID.

2. The method of claim 1, wherein the signal is a CDMA signal.

3. The method of claim 1, wherein the signal is an AMPS signal.

4. The method of claim 1, wherein the MRDS is generated at power-up by the mobile station.

5. The method of claim 1, wherein the MRDS is generated when the PRL is loaded into the mobile station.

6. The method of claim 1, wherein systems defined as more preferred in the ASL are systems currently available in a current geographic region the mobile station is in when the ASL is being updated.

7. A mobile station comprising:

a preferred roaming list (PRL);

a multi-region data structure (MRDS), where the MRDS includes system identification numbers (SIDs) from the PRL;

means for scanning and acquiring a system to provide service in a current geographic region;

means for marking the acquired system as a current serving system, the current serving system having a SID matching an entry in the PRL;

means for detecting that the current serving system matches an entry in the MRDS;

means for updating, in response to the detecting and without modification to the PRL, an alternate scan list (ASL), the ASL defining a current union of ail SIDs whose corresponding systems are more preferred than the system currently marked as the current serving system;

means for detecting a newly available SID using the ASL, the newly available SID associated with a system servicing a geographic region which overlaps the current geographic region of the current serving system;

means for acquiring the system servicing the overlapping geographic region when the newly acquired SID is more preferred than the SID of the system marked as the current serving system, using the MRDS and the PRL, the means for acquiring of the system servicing the overlapping region involves at least one of an intersystem hard handoff and an intrasystem hard handoff of the mobile station to a most desirable system;

means for marking the acquired system servicing the overlapping geographic region as the current serving system to redefine the current serving system; and means for re-updating the ASL using the newly acquired SID;

wherein the means for scanning and means for detecting the newly available SID involve periodically scanning for a signal indicative of a wireless service.

8. The mobile station of claim 7, wherein systems defined as more preferred in the ASL are systems currently available in a current geographic region the mobile station is in when the ASL is being updated.

9. A process-readable media including programmable instructions operable in a mobile station utilizing a preferred roaming list (PRL) and a multi-region data structure (MRDS), where the MRDS includes system identification numbers (SIDs) from the PRL, the instructions causing the mobile station to:

scan and acquire a system to provide service in a current geographic region;

mark the acquired system as a current serving system, the current serving system having a SID matching an entry in the PRL;

detect that the current serving system matches an entry in the MRDS;

update, in response to the detecting and without modification to the PRL, an alternate scan list (ASL), the ASL defining a current union of all SIDs whose corresponding systems are more preferred an the system currently marked as the current serving system;

scan, after generating the ASL, to detect a newly available SID using the ASL, the newly available SID associated with a system servicing a geographic region which overlaps the current geographic region of the current serving system;

acquire the system servicing the overlapping geographic region when the newly acquired SID is more preferred than the SID of the system marked as the current serving system, using the MRDS and the PRL, to perform at least one of an intersystem hard handoff and an intrasystem hard handoff of the mobile station to a most desirable system;

mark the acquired system servicing the overlapping geographic region as the current serving system to redefine the current serving system; and re-update the ASL using the newly acquired SID;

wherein the scanning and detecting the newly available SID involve periodically scanning for a signal indicative of a wireless service.

* * * * *

UNITED STATES PATENT AND TRADEMARK OFFICE
CERTIFICATE OF CORRECTION

PATENT NO.    : 6,584,311 B1
DATED         : June 24, 2003
INVENTOR(S)   : John R. Sorenson et al.

It is certified that error appears in the above-identified patent and that said Letters Patent is hereby corrected as shown below:

<u>Title page,</u>
Item [73], Assignee, please change the Assignee and Assignee resident to read
-- Qualcomm Incorporated (San Diego, CA), -- not "Qualcomm Incorporated (San Diego, IL)".

Signed and Sealed this

Fourth Day of November, 2003

JAMES E. ROGAN
*Director of the United States Patent and Trademark Office*